United States Patent Office 3,644,346
Patented Feb. 22, 1972

3,644,346
DIBENZOXAZEPINE SEMICARBAZONES
John W. Cusic, Skokie, Ill., and William E. Coyne, St. Paul, Minn., assignors to G. D. Searle & Co., Chicago, Ill.
No Drawing. Filed Oct. 27, 1969, Ser. No. 869,885
Int. Cl. C07d 87/54, 93/42
U.S. Cl. 260—240 G          4 Claims

ABSTRACT OF THE DISCLOSURE

Semicarbazones of dibenzoxazepine-N-carboxylic acid hydrazides and related compounds are described herein. The compounds are useful as anti-ulcer agents, anti-protozoal agents, and anti-algal agents. They are prepared by the reaction of the appropriate aldehyde with a semicarbazide.

---

The present invention relates to a group of compounds which are semicarbazones derived from a semicarbazide in which one of the nitrogens is part of a tricyclic system. More specifically, the present invention relates to a group of compounds having the following general formula

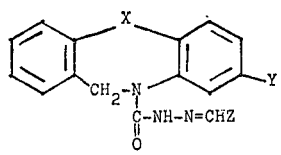

wherein X is selected from the group consisting of O and S; Y is selected from the group consisting of hydrogen, halogen, and trifluoromethyl; and Z is selected from the group consisting of phenyl, tolyl, halophenyl, methoxyphenyl, methylenedioxyphenyl, and pyridyl. The halogen atoms referred to above can be fluorine, chlorine, bromine, and iodine.

The semicarbazide structure appears in the present compounds so that they can properly be referred to as semicarbazones. However, since one of the nitrogens is part of a complex ring system, it is also possible to describe the present compounds as derivatives of the ring system in which case the present compounds would be derivatives of dibenzoxazepine-N-carboxylic acid hydrazide and related compounds.

The compounds of this invention are useful because of their pharmacological properties. In particular, these compounds are useful as anti-ulcer agents and anti-biotic agents against a number of organisms. Thus, they inhibit the growth of protozoa such as *Tetrahymena gelleii* and algae such as *Chlorella vulgaris*. In addition, they have been found to antagonize the effects of prostaglandins, specifically PGE$_2$. The compounds further do not demonstrate the anti-convulsant activity which is a characteristic of the semicarbazides from which they can be obtained.

The anti-ulcer utility of the present compounds can be demonstrated by their ability to inhibit ulceration in the Shay rat. The ulceration occurs in rats subjected to fasting and pyloric ligation as reported by Shay et al., Gastroenterology, 5, 43 (1945). In the test, male Charles River rats weighing 200–250 gms. and fasted 72 hours prior to ligation are used. Immediately following ligation, the prescribed dose of compound dissolved or suspended in 1.0 ml. of pH 2.0 hydrochloric acid is intragastrically administered to each of a group of 6 animals. A like group of animals receive the aldol alone and serves as controls. Precisely 19 hours later, the stomachs of surviving animals are excised and examined under 5× magnification. Any ulcers present are rated according to number and size and a compound found to produce a significant decrease in ulceration compared to the control animals is rated as active. When semicarbazones of the present application were tested at 50 mg. according to this procedure, they produced a significant decrease in ulceration.

The compounds of the present invention are conveniently prepared by the reaction of an appropriate aldehyde with a compound of the formula

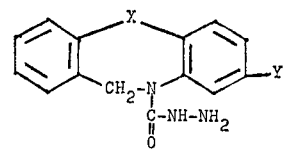

wherein X and Y are defined as above. The reaction is carried out in an inert solvent such as benzene at reflux temperatures. Water is formed during the course of the reaction and it may be removed from the mixture either by distillation or by the addition of a molecular sieve to the reaction mixture.

The following examples are presented to further illustrate the present invention; they should not be construed as limiting it in spirit or in scope. In these examples, quantities are indicated in parts by weight unless parts by volume are specified, and temperatures are indicated in degrees centigrade (° C.). The relationship between parts by weight and parts by volume is the same as that existing between grams and milliliters.

EXAMPLE 1

200 parts of 4-chloro-3-nitrobenzotrifluoride is heated to 160° C. and stirred and 160 parts of the potassium salt of salicylaldehyde is added over a period of 30 minutes. After the addition is complete, an exothermic reaction takes place and the temperature rises to about 195° C. Heating is then discontinued until the reaction subsides and the mixture is then heated for 1 hour at 150° C. The mixture is cooled, ice and water are added, and it is then extracted with ether. The ether layer is filtered to remove insoluble material and the resultant solution is dried over sodium sulfate. The ether solvent is then evaporated and the residual oil is recrystallized from a mixture of hexane and benzene to give 2-(2-nitro-4-trifluoromethylphenoxy) benzaldehyde melting at about 79–81° C.

A solution of 55 parts of the ether obtained in the preceding paragraph in 800 parts of ethanol is hydrogenated over Raney nickel catalyst at room temperature and atmospheric pressure. When hydrogen uptake ceases the catalyst is removed by filtration and the ethanol solvent is evaporated. The residue is then dissolved in 500 parts by volume of hexane, filtered, and then cooled. There is then obtained yellowish-white crystals which are separated by filtration to give 8-trifluoromethyl-10,11-dihydrodibenz[b,f][1,4]oxazepine melting at about 86–88° C.

EXAMPLE 2

13 parts of phosgene in 45 parts of toluene is stirred at 5–10° C. and 70 parts of ether is added. This is followed by the addition of a solution on 18.9 parts of 8-trifluoromethyl-10,11-dihydrodibenz[b,f][1,4]oxazepine and 7.2 parts of triethylamine in 140 parts of ether. After the addition is complete, the mixture is stirred for 2 hours and then filtered and the solvent is evaporated from the filtrate. The residue is dissolved in 200 parts by volume of hot hexane and this mixture is then filtered and cooled. This gives 8-trifluoromethyl - 10,11 - dihydrodibenz[b,f] [1,4]oxazepine-10-carbonyl chloride melting at about 102°–105° C.

EXAMPLE 3

To a stirred solution of 8 parts of phosgene in 30 parts of toluene at 5° C., there is added 50 parts of ether. This is followed by the addition of a solution of 12.4 parts of 10,11-dihydrodibenz[b,f][1,4]oxazepine and 6.4 parts of triethylamine in 90 parts of ether while the temperature is maintained at about 7° C. with cooling. The resultant suspension is stirred for 1 hour after the addition is complete before it is filtered. The residue is washed with ether and the solvent is evaporated from the combined filtrates under reduced pressure. The resultant residue is then recrystallized from petroleum ether to give 10,11-dihydrodibenz[b,f][1,4]oxazepine-10-carbonyl chloride melting at about 109–112° C.

If 8-chloro-10,11-dihydrodibenz[b,f][1,4]oxazepine is reacted with phosgene according to the procedure described in the preceding paragraph, the product obtained is 8-chloro-10,11-dihydrodibenz[b,f][1,4]oxazepine-10-carbonyl chloride. This compound melts at about 101–104° C. After recrystallization from petroleum ether.

EXAMPLE 4

To a solution of 7.3 parts of 100% hydrazine hydrate in 40 parts of ethanol there is added, at 5–10° C. with stirring, a solution of 13.0 parts of 10,11-dihydrodibenz[b,f][1,4]oxazepine-10-carbonyl chloride in 200 parts by volume of a 1:1 ether-methylene chloride solution. When the addition is complete, the mixture is allowed to warm to room temperature and stirred for 1 hour. The mixture is then filtered and the solvent is evaporated from the filtrate. The resultant residue is dissolved in chloroform and the chloroform solution is washed with water and dried over magnesium sulfate. The chloroform solvent is then evaporated and the resultant crude residue is triturated with petroleum ether to give a white solid which is then recrystallized from ethanol. The product thus obtained is 10,11-dihydrodibenz[b,f][1,4]oxazepine-10-carboxylic acid hydrazide melting at about 121–124° C. This compound has the following formula

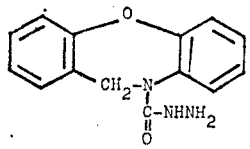

EXAMPLE 5

To a stirred solution of 3.3 parts of 100% hydrazine hydrate in 20 parts of ethanol at 5–10° C. there is added a solution of 6.5 parts of 8-chloro-10,11-dihydrodibenz[b,f][1,4]oxazepine-10-carbonyl chloride in 100 parts by volume of a 1:1 ether-methylene chloride solution. The resultant suspension is stirred for 16 hours at room temperature and the ether and methylene chloride are then evaporated. The resulting suspension is then stirred with 50 parts of water and filtered to give a white crystalline product. This is recrystallized from ethanol to give 8-chloro-10,11-dihydrodibenz[b,f][1,4]oxazepine-10-carboxylic acid hydrazide melting at about 179–181° C.

EXAMPLE 6

The procedure of Example 5 is repeated using 6.6 parts of 8-trifluoromethyl-10,11-dihydrodibenz[b,f][1,4]oxazepine-10-carbonyl chloride and 2.5 parts of hydrazine hydrate. In this case, the crude residue obtained after evaporation of the ether and methylene chloride is diluted with water and then extracted with ether. The combined ether extracts are dried over magnesium sulfate and the solvent is then evaporated to leave a colorless oil containing some crystals. The oil is triturated with hexane and the crystalline material which forms is separated by filtration and recrystallized from a mixture of benzene and hexane to give 8-trifluoromethyl-10,11-dihydrodibenz[b,f][1,4]oxazepine-10-carboxylic acid hydrazide melting at about 111–113° C.

EXAMPLE 7

The procedure of Example 5 is repeated using 13.8 parts of 10,11-dihydrodibenzo[b,f][1,4]thiazepine-10-carbonyl chloride and 7.3 parts of 100% hydrazine hydrate. The product obtained is 10,11-dihydrodibenzo[b,f][1,4]thiazepine-10-carboxylic acid hydrazide melting at about 140–142° C.

EXAMPLE 8

A solution of 4.7 parts of 10,11-dihydrobenz[b,f][1,4]oxazepine-10-carboxylic acid hydrazide and 2.0 parts of pyridine-4-carboxaldehyde in 45 parts of benzene is stirred and refluxed with 0.6 part molecular sieve. The mixture is refluxed for 1.5 hours and the precipitate which forms is removed by filtration. The solvent is evaporated from the filtrate until a white precipitate forms and the remaining filtrate is then cooled. The precipitate which forms is separated by filtration and then recrystallized from benzene to give 1-(4-pyridylmethylene)-2-(10,11-dihydrodibenz[b,f][1,4]oxazepine-10-carbonyl)hydrazine melting at about 180–185° C. This compound has the following formula

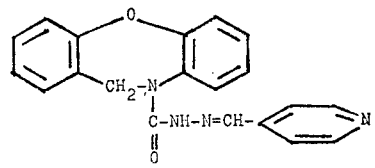

EXAMPLE 9

A solution of 4.7 parts of 10,11-dihydrodibenz[b,f][1,4]oxazepine-10-carboxylic acid hydrazide and 2.0 parts of pyridine-2-carboxaldehyde in 90 parts of benzene is refluxed for 45 minutes. The mixture is then cooled and the precipitate which forms is separated by filtration. The solid is then dissolved in ethanol and the first fraction which crystallizes is removed by filtration. The remaining filtrate is then concentrated and diluted with benzene to give a white crystalline product which is then separated and crystallized from ethanol to give 1-(2-pyridylmethylene)-2-(10,11-dihydrodibenz[b,f][1,4]oxazepine-10-carbonyl)-hydrazine melting at about 200–205° C.

EXAMPLE 10

8-chloro-10,11-dihydrodibenz[b,f][1,4]oxazepine-10-carboxylic acid hydrazide, 8-trifluoromethyl-10,11-dihydrodibenz[b,f][1,4]oxazepine-10-carboxylic acid hydrazide, and 10,11-dihydrodibenzo[b,f][1,4]thiazepine-10-carboxylic acid hydrazide are each reacted with pyridine-4-carboxaldehyde according to the procedure described in Example 8 to give, respectively, 1-(4-pyridylmethylene)-2-(8-chloro-10,11-dihydrodibenz[b,f][1,4]oxazepine-10-carbonyl)hydrazine, 1-(4-pyridylmethylene)-2-(8-trifluoromethyl-10,11-dihydrodibenz[b,f][1,4]oxazepine-10-carbonyl)hydrazine, and 1-(4-pyridylmethylene)-2-(10,11-dihydrobenzo[b,f][1,4]thiazepine-10-carbonyl)hydrazine.

EXAMPLE 11

If equivalent quantities of benzaldehyde, tolualdehyde, 4-chlorobenzaldehyde, 4-methoxybenzaldehyde, and piperonal are each substituted for the pyridine-2-carboxaldehyde and the procedure of Example 9 is repeated, the products obtained are, respectively, 1-benzylidene-2-(10,11-dihydrodibenz[b,f][1,4]oxazepine-10-carbonyl)hydrazine, 1-(4-methylbenzylidene)-2-(10,11-dihydrodibenz[b,f][1,4]oxazepine-10-carbonyl)hydrazine, 1-(4-chlorobenzylidene)-2-(10,11-dihydrodibenz[b,f]
 [1,4]oxazepine-10-carbonyl)hydrazine,
1-(4-methoxybenzylidene)-2-(10,11-dihydrodibenz[b,f]
 [1,4]oxazepine-10-carbonyl)hydrazine, and
1-piperonylidene-2-(10,11-dihydrodibenz[b,f][1,4]
 oxazepine-10-carbonyl)hydrazine.

What is claimed is:
1. A compound of the formula

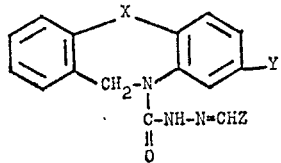

wherein X is selected from the group consisting of O and S; Y is selected from the group consisting of hydrogen, chlorine, and trifluoromethyl; and Z is selected from the group consisting of phenyl, tolyl, halophenyl, methoxyphenyl, methylenedioxyphenyl, and pyridyl.

2. A compound according to claim 1 which is 1-(4-pyridylmethylene) - 2 - (10,11 - dihydrodibenz[b,f][1,4] oxazepine-10-carbonyl)hydrazine.

3. A compound according to claim 1 which is 1-(2-pyridylmethylene) - 2 - (10,11 - dihydrodibenz[b,f][1,4] oxazepine-10-carbonyl)hydrazine.

4. A compound according to claim 1 which is 1-(4-pyridylmethylene) - 2 - (8-chloro-10,11-dihydrobenz[b,f] [1,4]oxazepine-10-carbonyl)hydrazine.

References Cited

Coyne et al., J. Med. Chem. 11 (6), 1158–60 (1968).

HENRY R. JILES, Primary Examiner

G. T. TODD, Assistant Examiner

U.S. Cl. X.R.

260—327 R, 333; 424—244, 275

UNITED STATES PATENT OFFICE
CERTIFICATE OF CORRECTION

Patent No. 3,644,346          Dated February 22, 1972

Inventor(s) John W. Cusic and William E. Coyne

It is certified that error appears in the above-identified patent and that said Letters Patent are hereby corrected as shown below:

Column 4, line 54 "dihydrobenzo" should be -- dihydrodibenzo --;

Column 4, line 63 "dihydrobenzo" should be -- dihydrodibenzo --; and

Claim 4, line 2, "dihydrobenz" should be -- dihydrodibenz --.

Signed and sealed this 15th day of August 1972.

(SEAL)
Attest:

EDWARD M. FLETCHER, JR.
Attesting Officer

ROBERT GOTTSCHALK
Commissioner of Patents